United States Patent [19]

Calamand

[11] Patent Number: 5,173,722
[45] Date of Patent: Dec. 22, 1992

[54] SAFETY DEVICE FOR SPECTACLE HINGE

[75] Inventor: Jean-Pierre Calamand, Oyonnax, France

[73] Assignee: Lunettes Calamand, Marchon-Arbent, France

[21] Appl. No.: 754,766

[22] Filed: Sep. 4, 1991

[30] Foreign Application Priority Data

May 15, 1991 [FR] France .................. 91 06065

[51] Int. Cl.⁵ .................................. G02C 5/22
[52] U.S. Cl. ......................... 351/153; 351/111
[58] Field of Search ..................... 351/153, 111

[56] References Cited

U.S. PATENT DOCUMENTS 4,895,438  1/1990  Zider et al. ............... 351/153 X
5,059,017 10/1991  Bennato ................... 351/153 X Primary Examiner—Eugene R. LaRoche
Assistant Examiner—Do Hyun Yoo
Attorney, Agent, or Firm—Dowell & Dowell

[57] ABSTRACT

A safety device for a hinge in a spectacle frame which includes two spaced flanges joined by a connecting tab. The spaced flanges are engageable against the top and bottom of the hinge area where the temple joins the lens-holder of the frame. Each flange has a notch which engages a portion of the adjacent lens-holder of the frame. A fastener associated with the hinge is retained between the spaced flanges, and the safety device is secured by allowing the fastener to extend into an opening in one of the flanges.

7 Claims, 1 Drawing Sheet

SAFETY DEVICE FOR SPECTACLE HINGE

BACKGROUND OF THE INVENTION

1. Field of the Invention

The present invention relates to spectacle frames and more particularly to a safety device adapted to be placed in the area of the hinge of each temple with the face of the frame. The safety device in question is advantageously, although not exclusively, applied to frames for children.

2. History of the Related Art

The hinge which constitutes the point of articulation between a temple and the face of a frame conventionally includes a screw whose threads cooperate with a tapped hole made in one of the portions of the fork-joint provided on an element associated with the face of the frame. The screw frequently becomes loose and gets lost, resulting in the separation of the temple and the face of the frame. Moreover, when the face of the frame is made of metal, each of its lens-holders is made with a filiform member of any cross section which includes a gap at the point on which the corresponding temple is articulated. To install a lens in position, the filiform member is opened, then tightened around the lens with the aid of an assembly screw. The safety device according to the invention likewise prevents this screw from loosening which ensures lens placement.

Finally, because of its rounded form, the device of the invention eliminates any contact between the wearer's face and the sharp edges of the two parts of the hinge.

SUMMARY OF THE INVENTION

The safety device of the invention includes two side elements joined by a connecting tab. The side elements are placed respectively against the top and bottom of the hinge of each temple with the face of the frame and each includes a notch which overlaps part of the corresponding lens-holder of the face of the frame.

BRIEF DESCRIPTION OF THE DRAWINGS

The invention will be more readily understood on reading the following description with reference to the accompanying drawings, in which.

Description of the Preferred Embodiment

Figure 2:
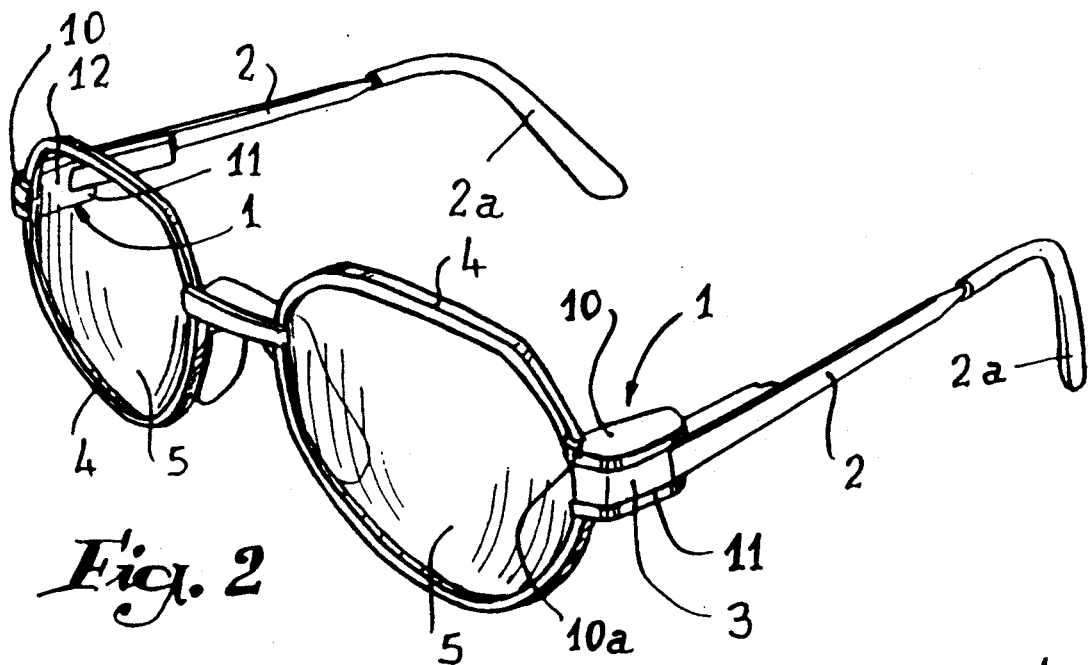
FIG. 2 is a view in perspective illustrating a pair of spectacles including two safety devices according to the invention.
Figure 1:
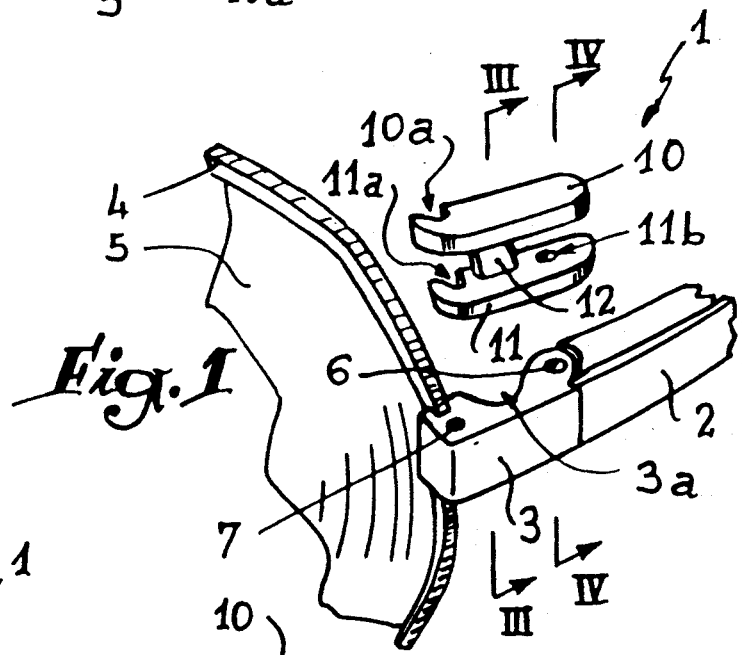
FIG. 1 is an enlarged partial perspective view of the hinge between a temple of a spectacle frame and its face, and in which a safety device according to the invention has been shown.

Referring now to the drawings, FIG. 1 illustrates a safety device according to the invention, generally referenced 1, and adapted to cooperate with the hinge area of each of the temples 2 of a spectacle frame wherein element 3 forms part of the face of the frame. The frame face conventionally includes two generally circular lens-holders 4 each retaining a lens 5.

Device 1 includes two spaced upper and lower flanges 10 and 11 having a roughly rectangular plane section with considerably rounded angles. The two flanges 10 and 11 are joined by a vertical tab 12 offset with respect to the plane of symmetry of device 1, so as to be tangential to the inner edges of the two side elements. The flanges each include a notch 10a, 11a, and flange 11 is also provided with a hole 11b.

It will be observed that the height of tab 12 is such that the distance between the two flanges 10 and 11 is less by a few tenths of a mm than the thickness of the hinge area of temple 2 with element 3.

In the example shown in the Figures, the generally circular lens-holders 4 are made of metal and have a gap at the point of connection of element 3. The element 3 is for example, secured to the end of the upper part of lens holder 4, while the end of the lower part thereof is provided with a tapped boss (not shown).

Element 3 includes at its end opposite that associated with lens-holder 4, the shape of a fork-joint in which is engaged a screw 6 around which pivots the end part of temple 2, as is well known in the art.

Element 3 further includes on its inner face a notch 3a whose purpose will be better explained hereinafter.

The positioning of a lens 5 in each lens-holder 4 which is then tightened by a screw 7 whose head is embedded in element 3, while its shank is screwed in the tapped hole of the boss of the end of the lower part of the lens-holder, will not be described in greater detail.

Figures 3, 4:
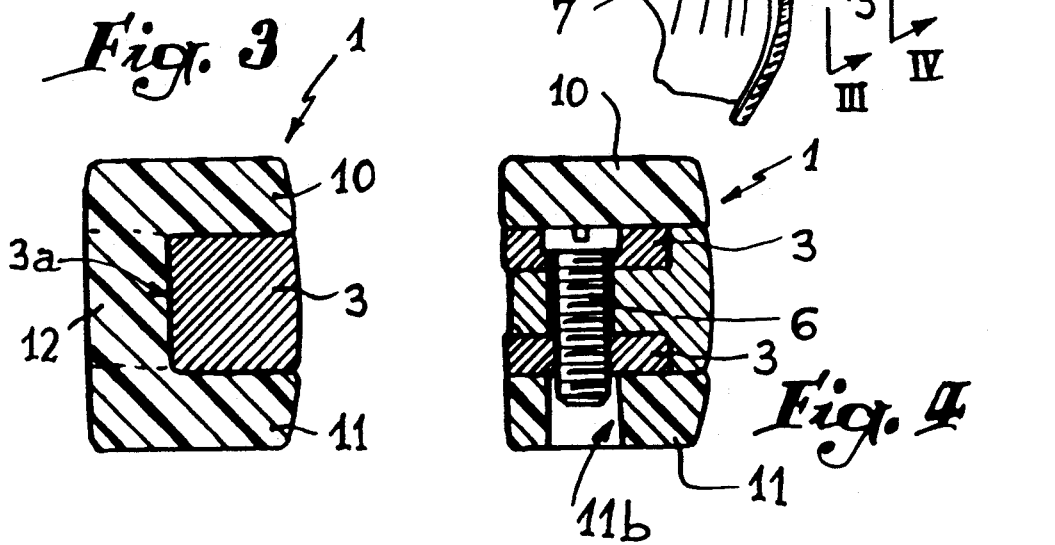
FIG. 3 is a section along III—III (FIG. 1).
FIG. 4 is a section along IV—IV (FIG. 1).

Each safety device is assembled as follows: each of the devices is offered inside element 3, being oriented obliquely, then the ends of the upper and lower flanges 10 and 11 having notches 10a and 11a are brought into overlapping relationship with respect to element 3 in order to bring the notches into opposed engagement with lens-holder 4. Each device is then tipped outwardly in order to bring, little by little, tab 12 into notch 3a of element 3 (FIG. 3) and then the two flanges 10 and 11 against the top and bottom of the hinge of each temple 2 with element 3. As the screw 6 projects beyond the underneath of element 3, the final position of each device 1 is locked by engagement of the projecting end of the screw in the hole 11b of the lower flange 11, as illustrated in FIG. 4 and because of the tightening of the flanges against the top and bottom of element 3.

Each device 1 may be made of an injection-moulded plastic material such as 6.6 nylon or other material of similar quality.

A safety device has thus been produced, which is particularly adapted to children's spectacles and which eliminates the sharp angles which are located at the area of the hinges of the spectacles. In addition, this device prevents the screw 6 of the corresponding hinge from unscrewing and getting lost. Finally, because of the invention, screw 7 for tightening the lens-holder 4 is also prevented from loosening.

From the aesthetic standpoint for children's spectacles, the colour of devices 1 may be matched to that of the endpieces 2a of temples 2 and to the decoration of the lens-holders 4.

It must, moreover, be understood that the foregoing description has been given only by way of non-limiting example and that it in no way limits the domain of the invention which would not be exceeded by replacing the details of execution described by any other equivalents.

What is claimed is:

1. A safety device for spectacle frames for retaining a fastening element which is associated with a hinge means which joins a temple to a lens-holder portion of the spectacle frames and wherein the hinge means has an upper and lower portion and a first thickness dimension when measured between the upper and lower portions, the safety device comprising, first and second flange elements, a tab means extending between and connecting said first and second flange elements in spaced relationship with respect to one another, a notch in each of said first and second flange elements, said notches being of a size to be engageable with the lens-holder portion of the spectacle frames, and said first and second flange elements being spaced a distance so as to engage the upper and lower portions of the hinge to thereby retain the fastening element therebetween.

2. The safety device of claim 1 in which one of said first and second flange elements includes an opening therein, the fastening element being extendable within said opening of said one of said first and second flange elements.

3. The safety device of claim 2 in which said first and second flange elements are generally parallel with respect to one another.

4. The safety device of claim 3 in which said first and second flange elements are spaced apart a distance which is less than said first thickness dimension of said hinge.

5. A safety device for spectacle frames for retaining a fastening element which is associated with a hinge means which hinge means joins a temple to a lens-holder portion of the frames, and wherein the hinge means has an upper and lower portion and is of a thickness when measured between said upper and lower portions of a first dimension, the safety device comprising, first and second flange elements, a tab means extending between and connecting said first and second flange elements in spaced relationship with respect to one another, and said first and second flange elements being spaced a distance apart which is less than said first dimension so as to be compressibly engageable with said upper and lower portions of said hinge means when seated thereon to retain the fastening element therebetween.

6. The safety device of claim 5 in which said first and second flange elements include notches of a size for engaging the lens-holder portion of the spectacle frames.

7. A safety device for spectacle frames for retaining a first fastening element which is associated with a hinge means which hinge means joins a temple to a lens-holder portion of the frames and wherein a second fastening element is provided through the hinge means for adjusting the lens-holder portion of the frames, and wherein the hinge means has an upper and lower portion and is of a thickness when measured between said upper and lower portions of a first dimension, the safety device comprising, first and second flange elements, a tab means extending between and connecting said first and second flange elements in spaced relationship with respect to one another, and said first and second flange elements being spaced a distance apart which is less than said first dimension so as to be compressibly engageable with said upper and lower portions of said hinge means when seated thereon to retain the first and second fastening elements therebetween.

* * * * *